US007942425B2

(12) United States Patent
Shojima

(10) Patent No.: US 7,942,425 B2
(45) Date of Patent: May 17, 2011

(54) PLASMA RESISTANT SEAL

(75) Inventor: Daihachi Shojima, Kumamoto (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/529,261

(22) PCT Filed: Aug. 7, 2003

(86) PCT No.: PCT/JP03/10088
§ 371 (c)(1),
(2), (4) Date: Mar. 25, 2005

(87) PCT Pub. No.: WO2004/038781
PCT Pub. Date: Jun. 5, 2004

(65) Prior Publication Data

US 2005/0253341 A1 Nov. 17, 2005

(30) Foreign Application Priority Data

Oct. 25, 2002 (JP) ................................ 2002-310663

(51) Int. Cl.
*F16J 15/10* (2006.01)

(52) U.S. Cl. ........ 277/652; 277/641; 277/647; 277/650; 277/914

(58) Field of Classification Search .................. 277/650, 277/652, 643, 641, 647, 920, 914
See application file for complete search history.

(56) References Cited

U.S. PATENT DOCUMENTS 2,862,736 A * 12/1958 Russell ........................ 277/451
3,375,016 A * 3/1968 Jellinek et al. ............... 277/645
3,687,465 A * 8/1972 Grime et al. ................. 277/619
4,039,741 A * 8/1977 Havens ........................ 277/608
5,538,262 A * 7/1996 Matsumura ................... 277/608
5,722,668 A * 3/1998 Rice et al. ..................... 277/650
6,092,486 A 7/2000 Mabuchi et al. .............. 118/723
6,165,313 A * 12/2000 Winters et al. ........... 156/345.35
6,328,847 B1 * 12/2001 Winters ................... 156/345.35
6,443,502 B1 * 9/2002 Iida et al. ...................... 285/351
6,730,385 B1 * 5/2004 Tanaka et al. ................ 428/66.4
2006/0041069 A1 * 2/2006 Sumi et al. .................... 525/192
2008/0157486 A1 * 7/2008 Kuzawa et al. ............... 277/650

FOREIGN PATENT DOCUMENTS

EP 0680071 A2 11/1995
JP 08-227876 9/1996
JP 09-320798 12/1997
JP 11-087320 3/1999
JP 2000-034466 2/2000
JP 2002-161264 6/2002

* cited by examiner

*Primary Examiner* — Alison K Pickard
(74) *Attorney, Agent, or Firm* — Jacobson Holman PLLC

(57) ABSTRACT

To make a plasma resistant seal excellent in both a plasma resisting performance and a sealing performance, and prevent an O-ring from protruding to a vacuum side gap, a plasma seal (6) made of PTFE having a plasma resisting performance is provided in a plasma irradiating side of an O-ring (5) as a main seal made of a rubber-like elastic material, an installation groove (4) shallower than a depth of an installation groove (3) provided in an installation member (2) is continuously provided in a plasma irradiation side of the installation groove (3), the O-ring (5) is attached to the installation groove (3), and the plasma seal (6) is attached to the installation groove (4) in a compressed state, or the O-ring is attached to the installation groove and the plasma seal is attached to the plasma irradiation side of the same installation groove (3) in a compressed state.

2 Claims, 8 Drawing Sheets

PLASMA RESISTANT SEAL

This is a nationalization of PCT/JP03/010088 filed Aug. 7, 2003 and published in Japanese.

TECHNICAL FIELD

The present invention relates to a plasma resistant seal corresponding to one of a sealing device, and more particularly to a plasma resistant seal having a structure in which a plasma seal is provided in a plasma side of a main seal rubber packing. The seal in accordance with the present invention is used in a field using plasma in an electronic industry such as a semiconductor industry, a liquid crystal industry, a sensor industry or the like.

BACKGROUND ART

A rubber O-ring 51 made of an FFKM rubber or an FKM rubber provided with a resistance characteristic against plasma has been conventionally used in a seal portion of an apparatus using plasma in an apparatus for manufacturing a semiconductor such as etching, ashing, plasma CVD or the like, as shown in FIG. 7. The apparatus mentioned above is structured such as to manufacture a semiconductor device by irradiating the plasma. Since the irradiation of the plasma is executed under a vacuum atmosphere, it is necessary to shut off an inner portion of the apparatus from an atmospheric pressure. Accordingly, the plasma resistant seal is used for this object.

However, since energy of the plasma is very strong, even the O-ring 51 made of the rubber such as the FFKM, the FKM or the like provided with the resistance characteristic is scraped due to an influence of the plasma as shown in FIG. 8, and is lost in some cases, so that there is a case that a sealing function is lowered. Further, since the lost O-ring piece forms a foreign material so as to produce a particle of the semiconductor device, there is a case that a function of the semiconductor device is significantly lowered. In particular, in recent years, a plasma condition in manufacturing the semiconductor becomes gradually severe (a plasma frequency is increased), and it is required to develop a seal which is excellent in both of a plasma resisting performance and a sealing performance so as to correspond to this matter. Further, on the basis of the seal structure constituted by a single unit of the O-ring 51 mentioned above, there is a risk that the O-ring 51 protrudes to a gap 52 in a vacuum side so as to be damaged.

Further, there is a case that a seal made of a polytetrafluorethylene (PTFE) is employed as a structure having the resistance characteristic against the plasma, in place of the rubber O-ring 51, however, since the PTFE is inferior to the FFKM and the FKM in a performance as an elastic body, a sealing performance against the atmospheric pressure is not so good.

Further, as the plasma resistant seal, there have been conventionally known a structure described in Japanese Unexamined Patent Publication No. 2002-161264, and a structure described in Japanese Unexamined Patent Publication No. 2000-34466. However, these prior arts are structured such that a composition structure of the rubber seal is improved for the purpose of improving the plasma resisting performance, and are not provided with a plasma seal in a plasma side of a main seal rubber packing as are different from the present invention.

Taking the above matters into consideration, an object of the present invention is to provide a plasma resistant seal which is excellent in both of a plasma resisting performance and a sealing performance, and can prevent a packing/O-ring from protruding to a gap in a vacuum side.

DISCLOSURE OF THE INVENTION

In order to achieve the object mentioned above, in accordance with a first aspect of the present invention, there is provided a plasma resistant seal comprising a plasma seal made of PTFE provided with a plasma resisting performance, the plasma seal being provided in a plasma irradiating side of an O-ring made of a rubber-like elastic material and serving as a main seal.

Further, in accordance with a second aspect of the present invention, there is provided a plasma resistant seal comprising a plasma seal made of a material provided with a plasma resisting performance, the plasma seal being provided in a plasma irradiating side of a packing made of a rubber-like elastic material and serving as a main seal.

Further, in accordance with a third aspect of the present invention, there is provided a plasma resistant seal as recited in the first aspect or the second aspect, wherein a plasma seal installation groove which is shallower than a depth of a packing/O-ring installation groove provided in an installation member is continuously provided in a plasma irradiation side of the packing/O-ring installation groove, the packing or the O-ring is attached to the packing/O-ring installation groove, and the plasma seal is attached to the plasma seal installation groove in a compressed state.

Further, in accordance with a fourth aspect of the present invention, there is provided a plasma resistant seal as recited in the first aspect or the second aspect, wherein the packing or the O-ring is attached to a packing/O-ring installation groove provided in an installation member, and the plasma seal is attached to a plasma irradiation side of the same installation groove in a compressed state.

In the seal in accordance with the first aspect of the present invention having the structure mentioned above, since the plasma seal made of the PTFE provided with the plasma resisting performance is provided in the plasma irradiating side of the O-ring made of the rubber-like elastic material and serving as the main seal, it is possible to seal the atmospheric pressure by the O-ring serving as the main seal so as to inhibit an inflow of the atmospheric pressure, and it is possible to seal the plasma by the plasma seal so as to inhibit the plasma from being applied to the O-ring. Since the O-ring and the plasma seal are provided together so as to share the function, it is possible to selectively use a material suitable for the sealing performance in the O-ring and a material suitable for the plasma resisting performance in the plasma seal. Further, the plasma seal arranged in the plasma irradiating side, that is, the vacuum side of the O-ring operates as a backup ring to the O-ring.

In the seal in accordance with the second aspect of the present invention having the structure mentioned above, since the plasma seal made of the material provided with the plasma resisting performance is provided in the plasma irradiating side of the packing made of the rubber-like elastic material and serving as the main seal, it is possible to seal the atmospheric pressure by the packing serving as the main seal so as to inhibit an inflow of the atmospheric pressure, and it is possible to seal the plasma by the plasma seal so as to inhibit the plasma from being applied to the packing. The packing corresponds to a broader term including the O-ring, and a cross sectional shape thereof is not limited. Further, the packing includes a structure having a sealing lip or bead. Since the packing and the plasma seal are provided together so as to share the function, it is possible to selectively use a material suitable for the sealing performance in the packing and a material suitable for the plasma resisting performance in the plasma seal. Further, the plasma seal arranged in the plasma irradiating side, that is, the vacuum side of the packing operates as a backup ring to the packing.

The seal constituted by a combination of the packing/O-ring and the plasma seal is attached to the installation groove which is previously provided in the installation member, and the plasma seal is attached to the plasma irradiating side of the packing/O-ring for the purpose of protecting the packing/O-ring from the plasma. As a structure of the installation, as described in the third aspect, it is preferable that the plasma seal installation groove which is shallower than the depth of the packing/O-ring installation groove is continuously provided in the plasma irradiation side of the packing/O-ring installation groove arranged in the installation member, the packing/O-ring is attached to the latter packing/O-ring installation groove, and the plasma seal is attached to the former plasma seal installation groove. In accordance with this structure, since the packing/O-ring is engaged with a side wall portion of an inner surface of the packing/O-ring installation groove, and the plasma seal is engaged with a side wall portion of the plasma seal installation groove, it is possible to prevent the packing/O-ring or the plasma seal from being sucked to the vacuum side so as to be moved. Further, the structure of the installation may be made, as described in the fourth aspect, such that the packing/O-ring is attached to the packing/O-ring installation groove provided in the installation member, and the plasma seal is attached to the plasma irradiation side of the same installation groove. In any case, when the plasma seal is compressed between the installation member and the opponent member at a time of the installation, the plasma is further hard to pass through the plasma seal. Accordingly, it is possible to improve a plasma shielding effect achieved by the plasma seal.

In this case, the present application includes the following technical matters.

In other words, in order to achieve the object mentioned above, one plasma resistant seal proposed by the present application is provided with the following contents.

(1) Relevant to the First Aspect and the Third Aspect (1-1) A plasma seal made of PTFE having a resistance characteristic against the plasma is placed at a position to which the plasma comes, and a rubber O-ring is placed in a rear side thereof. Accordingly, since the PTFE shuts off the plasma, it is possible to inhibit the O-ring from being deteriorated or lost by plasma irradiation energy. Further, since the rubber O-ring having elasticity is arranged in the rear side (the rear side in view of pressure) of the PTFE, it is possible to seal the atmospheric pressure so as to secure a vacuum sealing property.

(1-2) The PTFE plasma seal is used in a compressed state. Accordingly, since the plasma is hard to pass through the PTFE, it is possible to improve a plasma shielding effect.

(1-3) The PTFE plasma seal is formed in a long shape along a diametrical direction of the seal and the apparatus, that is, a plasma irradiating direction. Accordingly, since a distance at which the plasma is applied to the O-ring becomes long, it is possible to increase the plasma shielding effect.

(1-4) The PTFE plasma seal is formed in a flat shape in across section. Since a great load is required for compressing the PTFE, a compression margin is reduced by making the PTFE in the flat shape, and it is possible to make the compression load small. Further, it is possible to make a groove space in a small cross section.

(1-5) Further, the structure may be made such that a spring force is generated in the PTFE by making the PTFE plasma seal in a round shell shape in a cross section. In the case of using the resin in a compressed state, there is a risk that a compressive creep peculiar to the resin is generated, however, it is possible to inhibit the creep from being generated by generating the spring force on the basis of the round union end shape of the PTFE.

(1-6) The PTFE plasma seal is brought into close contact with the vacuum side wall. Accordingly, it is possible to prevent the PTFE from being sucked to the vacuum side and it is possible to keep a stable state even under a negative pressure.

(1-7) The O-ring is put in the groove for the O-ring. Accordingly, it is possible to prevent the O-ring from being sucked to the vacuum side and it is possible to keep a stable state even under a negative pressure.

(2) Relevant to the Second Aspect and the Fourth Aspect (2-1) A plasma seal made of PTFE having a resistance characteristic against the plasma is placed at a position to which the plasma comes, and a rubber O-ring is placed in a rear side thereof. Accordingly, since the PTFE shuts off the plasma, it is possible to inhibit the O-ring from being deteriorated or lost by plasma irradiation energy. Further, since the rubber O-ring having elasticity is arranged in the rear side (the rear side in view of pressure) of the PTFE, it is possible to seal the atmospheric pressure so as to secure a vacuum sealing property.

(2-2) The PTFE plasma seal is used in a compressed state. Accordingly, since the plasma is hard to pass through the PTFE, it is possible to improve a plasma shielding effect.

(2-3) The PTFE plasma seal is formed in a tubular shape, and is attached to the installation groove together with the O-ring. Accordingly, the groove can be shared for both the plasma seal and the O-ring.

(2-4) Further, the structure may be made such that a spring force is generated in the PTFE by making the PTFE plasma seal in a wedge shape in a cross section. In the case of using the plasma seal in a compressed state, there is a risk that a compressive creep is generated, however, it is possible to inhibit the creep from being generated by generating the spring force on the basis of the wedge shape of the PTFE.

(2-5) The PTFE plasma seal is brought into close contact with the vacuum side wall or slightly elongated (expanded). Accordingly, it is possible to prevent the PTFE from being sucked to the vacuum side and it is possible to keep a stable state even under a negative pressure.

(2-6) The O-ring is put in the groove for the O-ring together with the PTFE. Accordingly, it is possible to prevent the O-ring from being sucked to the vacuum side and it is possible to keep a stable state even under a negative pressure.

(2-7) Further, in the case that the PTFE is formed in the wedge shape in a cross section, the O-ring is brought into close contact with the recess side of the PTFE or slightly elongated (expanded). Accordingly, it is possible to make the O-ring assist the spring force of the PTFE.

(3) In order to improve the plasma resisting performance, a PTFE backup ring is applied to the packing/O-ring. The packing/O-ring functions as a vacuum seal, and the PTFE backup ring functions as a plasma shield.

BEST MODE FOR CARRYING OUT THE INVENTION

Next, a description will be given of embodiments in accordance with the present invention with reference to the accompanying drawings.

First Embodiment

Figure 1:
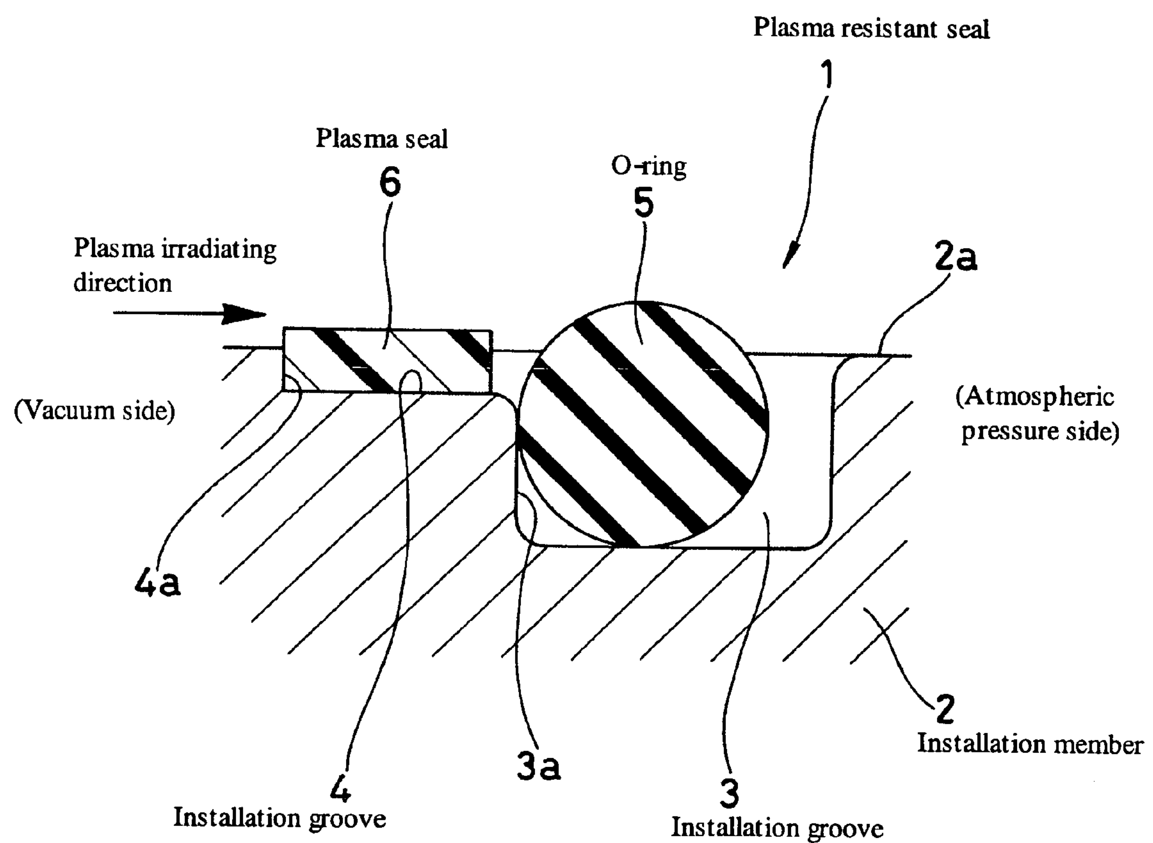
FIG. 1 is a cross sectional view of a main portion of a plasma resistant seal in accordance with a first embodiment of the present invention.

FIG. 1 shows a cross section of a plasma resistant seal 1 in accordance with a first embodiment of the present invention. The seal 1 in accordance with the embodiment mentioned above is used in a semiconductor manufacturing apparatus, more specifically, an exhaust portion, an intake portion or a chamber portion of a vacuum pump for a semiconductor, or a piping portion or a chamber portion of an etching, ashing or plasma CVD apparatus, and is structured as follows.

First, an annular O-ring installation groove 3 is provided in an end surface portion 2*a* of an installation member (a housing in one side) 2 to which the seal 1 is attached, and a plasma seal installation groove 4 which is shallower than a depth of the O-ring installation groove 3 is continuously provided in a plasma irradiating side (an inner diameter side, a left side in the drawing) of the O-ring installation groove 3. Each of the installation grooves 3 and 4 is formed in an approximately quadrangular cross sectional shape, and side wall portions 3*a* and 4*a* forming a right angle with respect to the end surface portion 2*a* are provided in an inner surface in the plasma irradiating side.

An O-ring 5 serving as a main seal of the seal 1 is attached to the O-ring installation groove 3 mentioned above. On the other hand, a plasma seal 6 is attached to the plasma seal installation groove 4.

The O-ring 5 is formed in a circular shape in a cross section by a predetermined rubber-like elastic material, for example, an FKM rubber, more specifically, an inorganic component free plasma resisting FKM rubber, and when the installation member 2 is assembled with an opponent member (a housing in the other side, not shown) from an illustrated state, the O-ring 5 is compressed in the top to bottom direction in the drawing between both the members.

The plasma seal 6 is formed in an annular flat shape by a predetermined PTFE, for example, an unfilled type PTFE, and a cross sectional shape thereof is formed in a rectangular shape being long from side to side in the drawing, in which the longitudinal direction of the rectangular is arranged along a plasma irradiating direction. The plasma seal 6 is also compressed in the top to bottom direction in the drawing between both the members in the case that the installation member 2 is assembled with the opponent member from an illustrated state.

The seal 1 having the structure mentioned above is structured such as to seal the semiconductor manufacturing apparatus so as to prevent the external atmospheric pressure from flowing into the apparatus, in the semiconductor manufacturing apparatus mentioned above, and is characterized in that the following operations and effects can be achieved on the basis of the structure mentioned above.

(1) It is possible to prevent the atmospheric air from flowing into the apparatus on the basis of the sealing effect of the O-ring 5 made of the rubber-like elastic material and attached between the installation member 2 and the opponent member in the compressed state.

(2) Since the plasma seal 6 made of the PTFE provided with the plasma resisting performance is provided in the plasma irradiating side of the O-ring 5, the plasma seal 6 shuts off the plasma in the inner portion of the apparatus. Accordingly, it is possible to inhibit the O-ring 5 from being exposed to the plasma irradiating energy so as to be deteriorated or lost.

(3) Since the plasma seal 6 is attached between the installation member 2 and the opponent member in the compressed state, the plasma is further hard to pass through the plasma seal 6 in comparison with the case of not being compressed. Accordingly, since the great plasma shielding effect is obtained, it is possible to further effectively protect the O-ring 5.

(4) Since the plasma seal 6 is formed in the rectangular shape in the cross section which is long along the plasma irradiating direction, the distance at which the plasma is brought into contact with the O-ring 5 is long. Accordingly, since the great plasma shielding effect can be obtained, it is possible to further effectively protect the O-ring 5.

(5) The great load is generally required for compressing the PTFE, however, since the plasma seal 6 is formed thin in the flat shape, the compression margin is reduced and the compression load can be reduced. Accordingly, it is possible to comparatively easily compress the plasma seal 6 made by the PTFE. Further, since a cross sectional area of the installation groove 4 can be made small, it is easy to form the installation groove 4.

(6) When the inner portion of the apparatus becomes under the vacuum state, there is a risk that the plasma seal 6 and the O-ring 5 is sucked so as to be moved, tilted or twisted, however, since the plasma seal 5 is engaged with a side wall portion 4*a* of the installation groove 4 and the O-ring 5 is engaged with a side wall portion 3*a* of the installation groove 3 so as to be stably held respectively, it is possible to eliminate the risk.

(7) Since the plasma seal 6 is arranged in the plasma irradiating side, that is, the vacuum side of the O-ring 5, the plasma seal 6 operates as the backup ring to the O-ring 5. Accordingly, it is possible to prevent the O-ring 5 from protruding to a vacuum side gap (a gap between the installation member 2 and the opponent member formed in a left side in the drawing of the plasma seal 6 in FIG. 1) so as to be broken.

(8) Since the unfilled type PTFE is particularly used as a material of the plasma seal 6, and the unfilled type PTFE does not contain an inorganic component producing the particle, it is possible to inhibit the particle from being generated even if the plasma seal 6 is damaged on the basis of the plasma irradiation.

(9) Since an inorganic component free plasma resisting FKM rubber is particularly used as a material of the O-ring 5, and the inorganic component free plasma resisting FKM rubber does not contain the inorganic component producing the particle, similarly to the unfilled type PTFE, it is possible to inhibit the particle from being generated even if the O-ring 5 is damaged.

Second Embodiment

In the first embodiment mentioned above, the plasma seal 6 is formed in the flat shape and in the rectangular shape long from side to side in the cross section, however, in the case that the plasma seal 6 is formed in a round shell shape in a cross section, it is possible to apply a spring property at an attaching time to the plasma seal 6.

Figure 2:
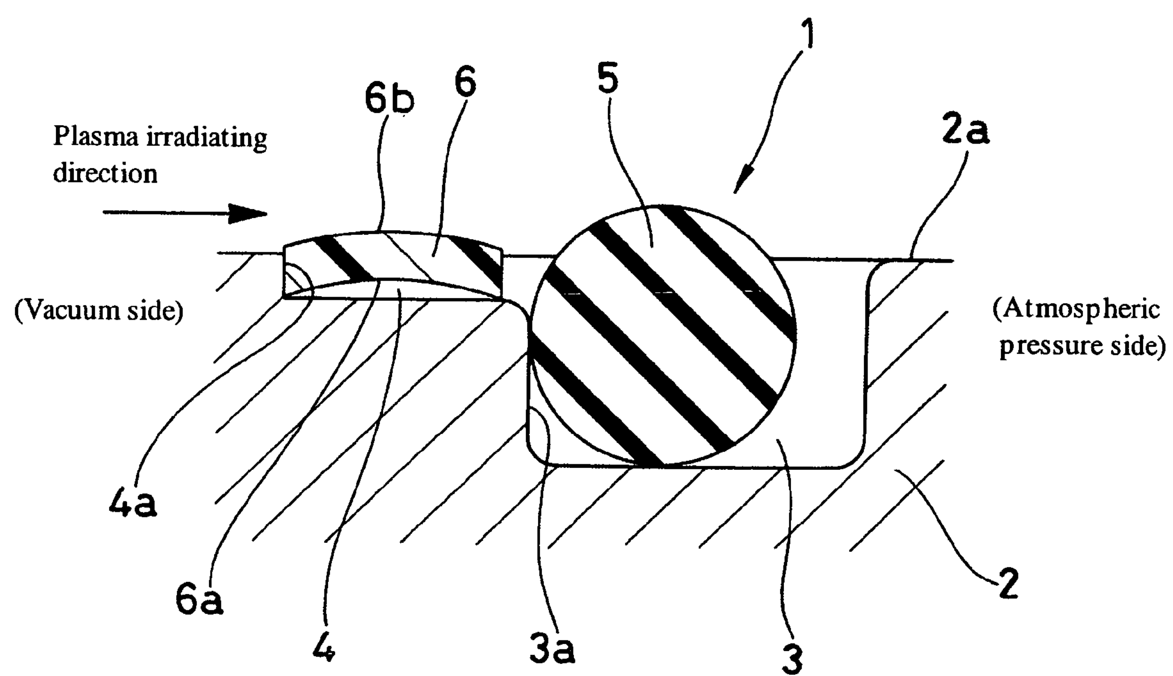
FIG. 2 is a cross sectional view of a main portion of a plasma resistant seal in accordance with a second embodiment of the present invention.

In other words, as shown in FIG. 2, the plasma seal 6 is formed by a predetermined PTFE, for example, an unfilled type PTFE, and is formed in a round shell shape being long from side to side in the drawing in a cross section, in which a longitudinal direction is arranged along a plasma irradiating direction. The round union end shape means a so-called circular arc shape, and the plasma seal 6 is structured such that a surface in a groove bottom side (a lower surface in the drawing) 6*a* is formed to be a concave in a circular arc shape in a cross section, and a surface in an opponent member side (an upper surface in the drawing) 6*b* is formed to be a convex in a circular arc shape in a cross section.

When the plasma seal 6 is pinched between the installation member 2 and the opponent member from an illustrated state, the plasma seal is elastically deformed so as to be pressed and elongated flatly, and is strongly pressed against both the members on the basis of an elastic restoring force thereof. The PTFE plasma seal 6 provided with the spring force can effectively prevent a creep from being generated. The other structures and the other operations and effects of the second embodiment are the same as those of the first embodiment mentioned above.

Third Embodiment

Figure 3:
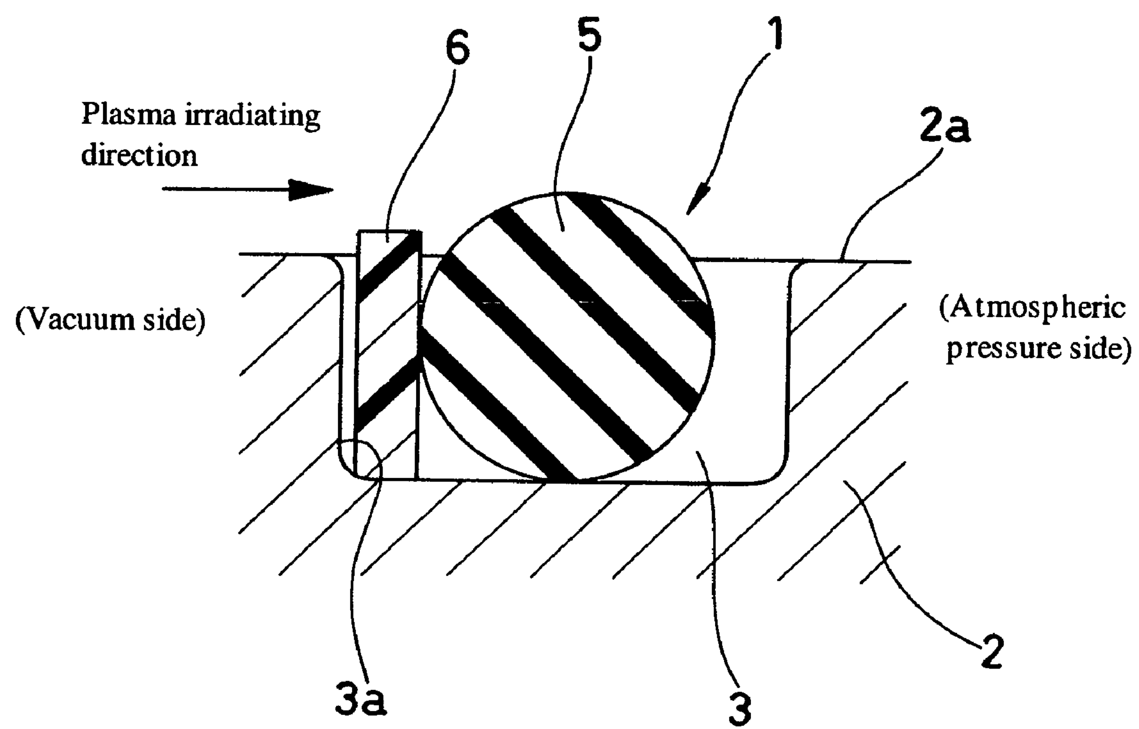
FIG. 3 is a cross sectional view of a main portion of a plasma resistant seal in accordance with a third embodiment of the present invention.

FIG. 3 shows a cross section of a plasma resistant seal 1 in accordance with a third embodiment of the present invention. The seal 1 in accordance this the embodiment is used in a semiconductor manufacturing apparatus, more specifically, an exhaust portion, an intake portion or a chamber portion of a vacuum pump for a semiconductor, or a piping portion or a chamber portion of an etching, ashing or plasma CVD apparatus, and is structured as follows.

First, an annular O-ring installation groove 3 is provided in an end surface portion 2*a* of an installation member (a housing in one side) 2 to which the seal 1 is attached. The installation groove 3 is formed in an approximately quadrangular cross sectional shape, and a side wall portion 3*a* forming a right angle with respect to the end surface portion 2*a* are provided in an inner surface in the plasma irradiating side.

An O-ring 5 serving as a main seal of the seal 1 is attached to the O-ring installation groove 3 mentioned above, and a plasma seal (also called as a backup ring) 6 is attached to a plasma irradiating side (an inner diameter side, a left side in the drawing) of the installation groove 3.

The O-ring 5 is formed in a circular shape in a cross section by a predetermined rubber-like elastic material, for example, an FKM rubber, more specifically, an inorganic component free plasma resisting FKM rubber, and when the installation member 2 is assembled with an opponent member (a housing in the other side, not shown) from an illustrated state, the O-ring 5 is compressed in the top to bottom direction in the drawing between both the members.

The plasma seal 6 is formed in a cylindrical shape by a predetermined PTFE, for example, an unfilled type PTFE, and a cross sectional shape thereof is formed in a rectangular shape being longer than is wide in the drawing in which the longitudinal direction of the rectangular is arranged along a direction orthogonal to a plasma irradiating direction. The plasma seal 6 is also compressed in the top to bottom direction in the drawing between both the members in the case that the installation member 2 is assembled with the opponent member from an illustrated state.

The seal 1 having the structure mentioned above is structured such as to seal the semiconductor manufacturing apparatus so as to prevent the external atmospheric pressure from flowing into the apparatus, in the semiconductor manufacturing apparatus mentioned above, and is characterized in that the following operations and effects can be achieved on the basis of the structure mentioned above.

(1) It is possible to prevent the atmospheric air from flowing into the apparatus on the basis of the sealing effect of the O-ring 5 made of the rubber-like elastic material and attached between the installation member 2 and the opponent member in the compressed state.

(2) Since the plasma seal 6 made of the PTFE provided with the plasma resisting performance is provided in the plasma irradiating side of the O-ring 5, the plasma seal 6 shuts off the plasma in the inner portion of the apparatus. Accordingly, it is possible to inhibit the O-ring 5 from being exposed to the plasma irradiating energy so as to be deteriorated or lost.

(3) Since the plasma seal 6 is attached between the installation member 2 and the opponent member in the compressed state, the plasma is further hard to pass through the plasma seal 6 in comparison with the case of not being compressed. Accordingly, since the great plasma shielding effect is obtained, it is possible to further effectively protect the O-ring 5.

(4) Since the plasma seal 6 is formed in the cylindrical shape and is attached to the same installation groove 3 as that of the O-ring 5, it is possible to use the installation groove 3 in common, and it is possible to easily form the installation groove 3.

(5) When the inner portion of the apparatus becomes under the vacuum state, there is a risk that the plasma seal 6 and the O-ring 5 is sucked so as to be moved, tilted or twisted, however, since the plasma seal 5 is engaged with a side wall portion 3*a* of the installation groove 3 and the O-ring 5 is engaged with the plasma seal 6 so as to be stably held respectively, it is possible to eliminate the risk.

(6) Since the plasma seal 6 is arranged in the plasma irradiating side, that is, the vacuum side of the O-ring 5, the plasma seal 6 operates as the backup ring to the O-ring 5. Accordingly, it is possible to prevent the O-ring 5 from protruding to a vacuum side gap (a gap between the installation member 2 and the opponent member formed in a left side in the drawing of the plasma seal 6 in FIG. 3) so as to be broken.

(7) Since the unfilled type PTFE is particularly used as a material of the plasma seal 6, and the unfilled type PTFE does not contain an inorganic component producing the particle, it is possible to inhibit the particle from being generated even if the plasma seal 6 is damaged on the basis of the plasma irradiation.

(8) Since an inorganic component free plasma resisting FKM rubber is particularly used as a material of the O-ring 5, and the inorganic component free plasma resisting FKM rubber does not contain the inorganic component producing the particle, similarly to the unfilled type PTFE, it is possible to inhibit the particle from being generated even if the O-ring 5 is damaged.

Fourth Embodiment

In the third embodiment mentioned above, the plasma seal 6 is formed in the cylindrical shape and in the rectangular shape being longer than is wide in the cross section, however, in the case that the plasma seal 6 is formed in a wedge shape in a cross section, it is possible to apply a spring property at an attaching time to the plasma seal 6.

Figure 4:
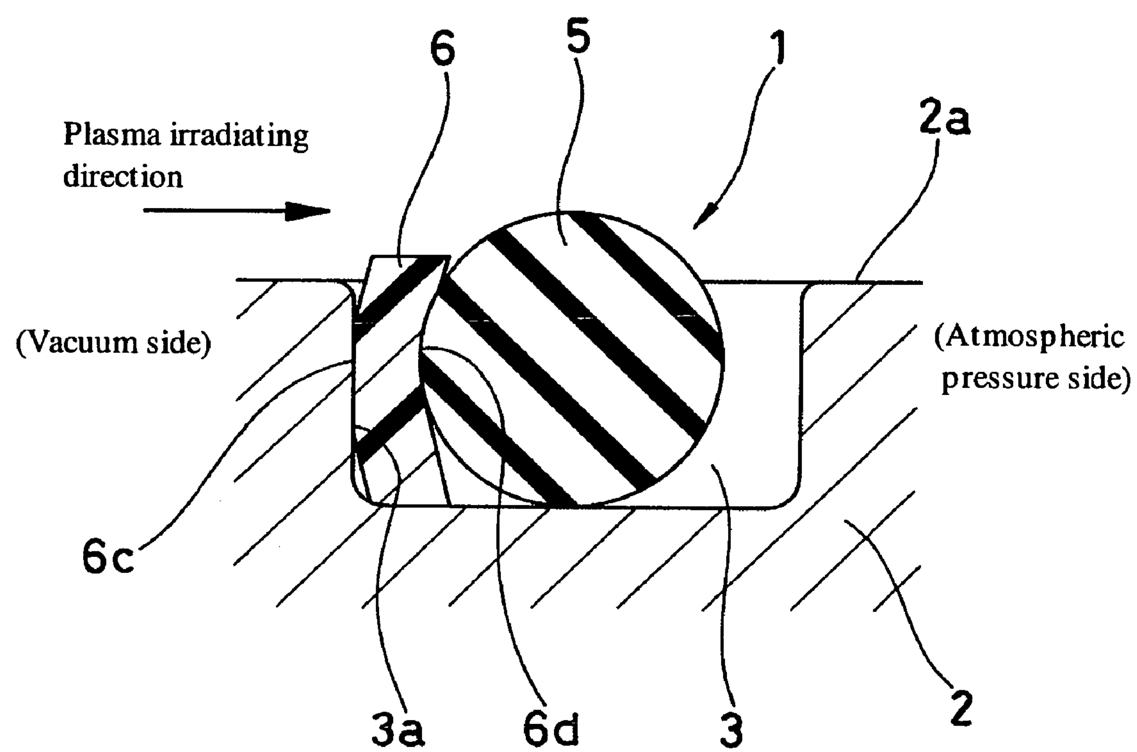
FIG. 4 is a cross sectional view of a main portion of a plasma resistant seal in accordance with a fourth embodiment of the present invention.

In other words, as shown in FIG. 4, the plasma seal 6 is formed by a predetermined PTFE, for example, an unfilled type PTFE, and is formed in a wedge shape being longer than is wide in the drawing in a cross section, in which a longitudinal direction is arranged along a direction orthogonal to a plasma irradiating direction. The wedge shape means a so-called V shape, and the plasma seal 6 is structured such that a surface in a plasma irradiating side (a left surface in the drawing) 6*c* is formed in a convex side of V shape in a cross section, and a surface in an atmospheric pressure side (a right surface in the drawing) 6*d* is formed in a concave side of V shape in a cross section (in this case, a top portion of the convex side of V shape is formed to have a flat portion which is perpendicular to the end surface portion 2*a* in order to make the plasma seal 6 well attach on the side wall portion 3*a*, and a valley bottom portion of the concave side of V shape is formed in a circular arc shape in a cross section in order to make the O-ring 5 closely contact with the plasma seal 6).

When the plasma seal 6 is pinched between the installation member 2 and the opponent member from an illustrated state, the plasma seal is elastically deformed so as to reduce an angle of the V shape, and is strongly pressed against both the members on the basis of an elastic restoring force thereof. The PTFE plasma seal 6 provided with the spring force can effectively prevent a creep from being generated. Further, since the O-ring 5 is brought into close contact with the valley bottom portion of the concave side of V shape of the plasma seal 6, it is possible to increase the spring force of the plasma seal 6 by the O-ring 5 (because the O-ring 5 makes the V shape of the plasma seal 6 hard to be bent), so that it is possible to prevent the O-ring 5 from flying out from the plasma seal 6. The other structures and the other operations and effects of the fourth embodiment are the same as those of the second embodiment mentioned above.

In this case, in the first embodiment to the fourth embodiment, the description is given of the plasma seal made of the PTFE corresponding to the resin, however, it is possible to apply to a plasma seal made of the PTFE corresponding to the rubber, as far as the plasma seal has a function serving as the backup ring with respect to the O-ring.

Further, since the inventors of the present invention have carried out a plasma irradiation evaluation test, a description will be given below.

Figure 5:
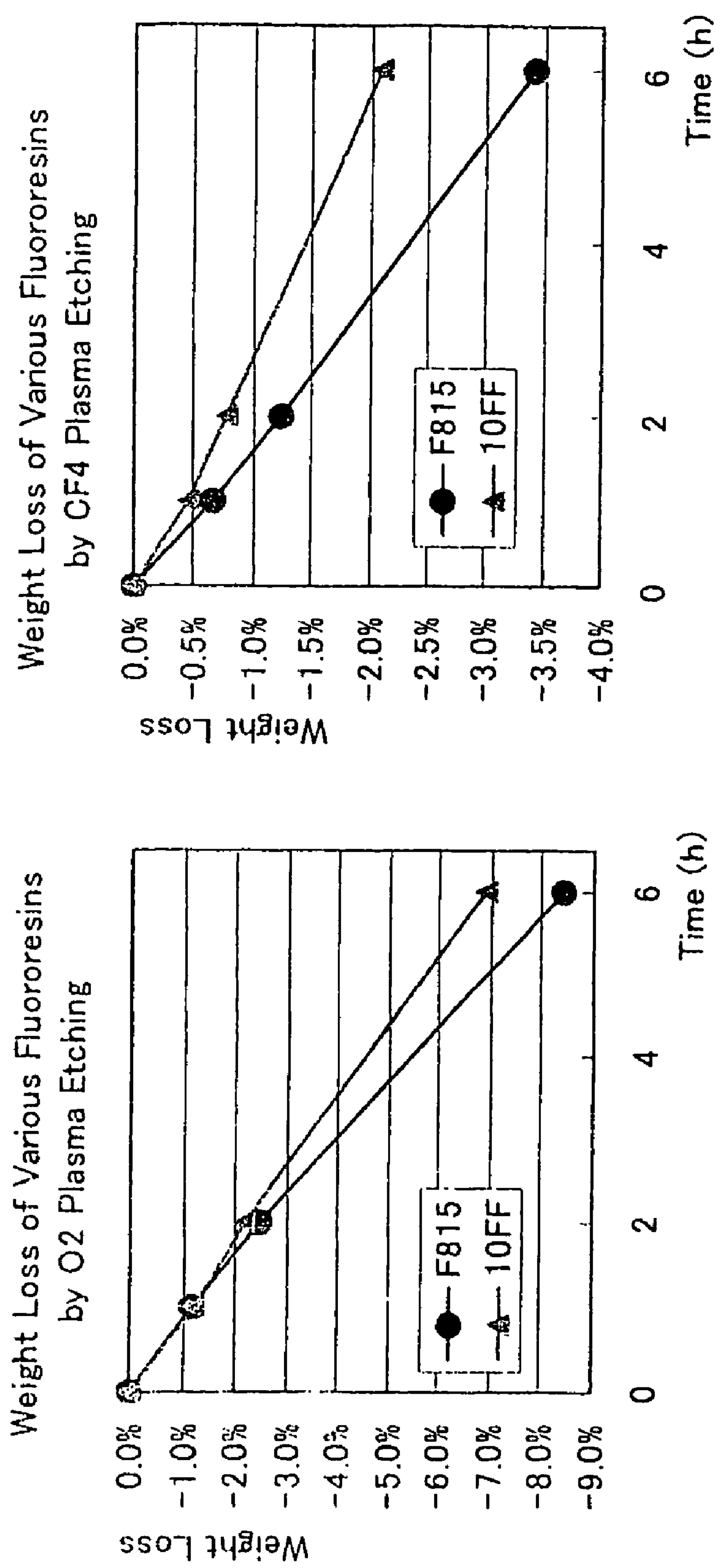
FIG. 5 is a graph showing results of a plasma irradiation evaluation test.

Results shown in a graph in FIG. 5 were obtained by comparing a weight reduction between PTFE (10FF) and a plasma resisting FKM (F815) after irradiating the plasma (plasma gas: $O_2$, $CF_4$). In accordance with the results, the weight reduction of the PTFE (10FF) is less than the weight reduction of the plasma resisting FKM (F815) in both the gases, so that it is possible to confirm that the PTFE is excellent in a durability.

Figure 6:
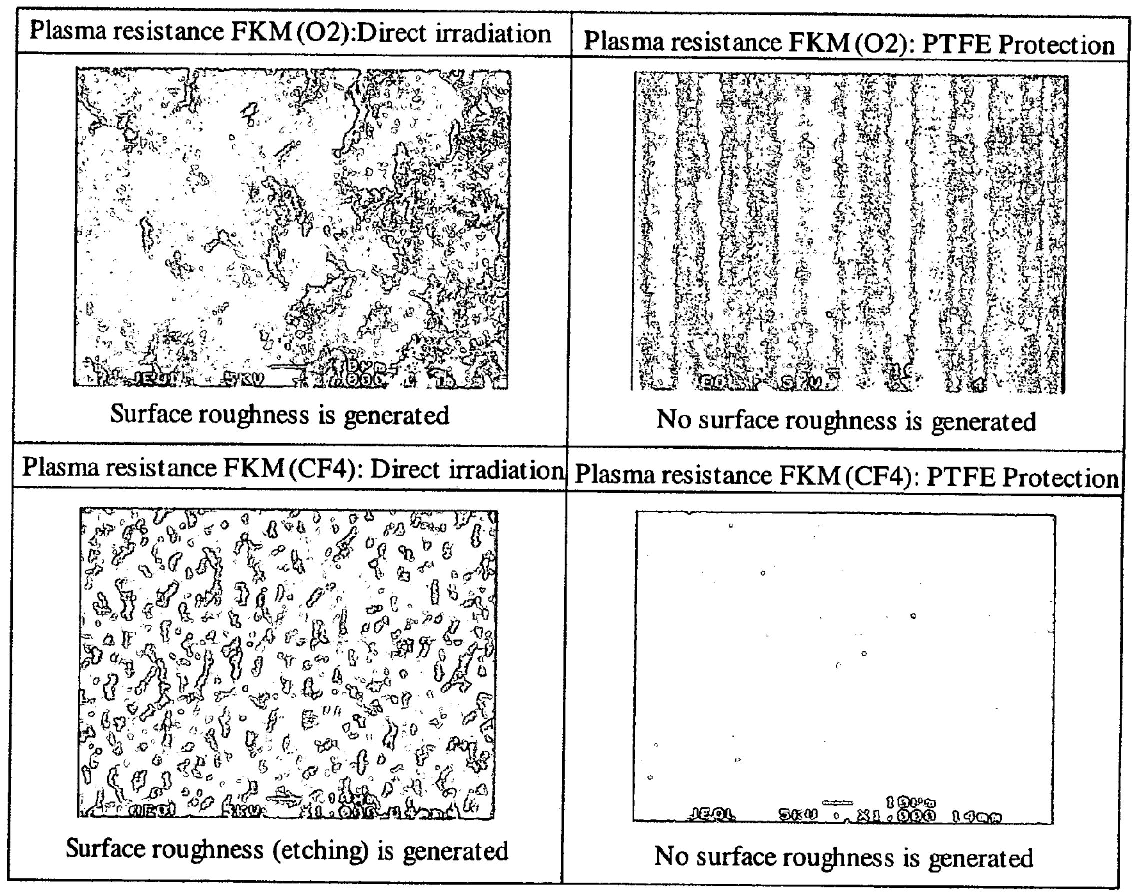
FIG. 6 is a photo map showing results of the plasma irradiation evaluation test.
Figure 7:
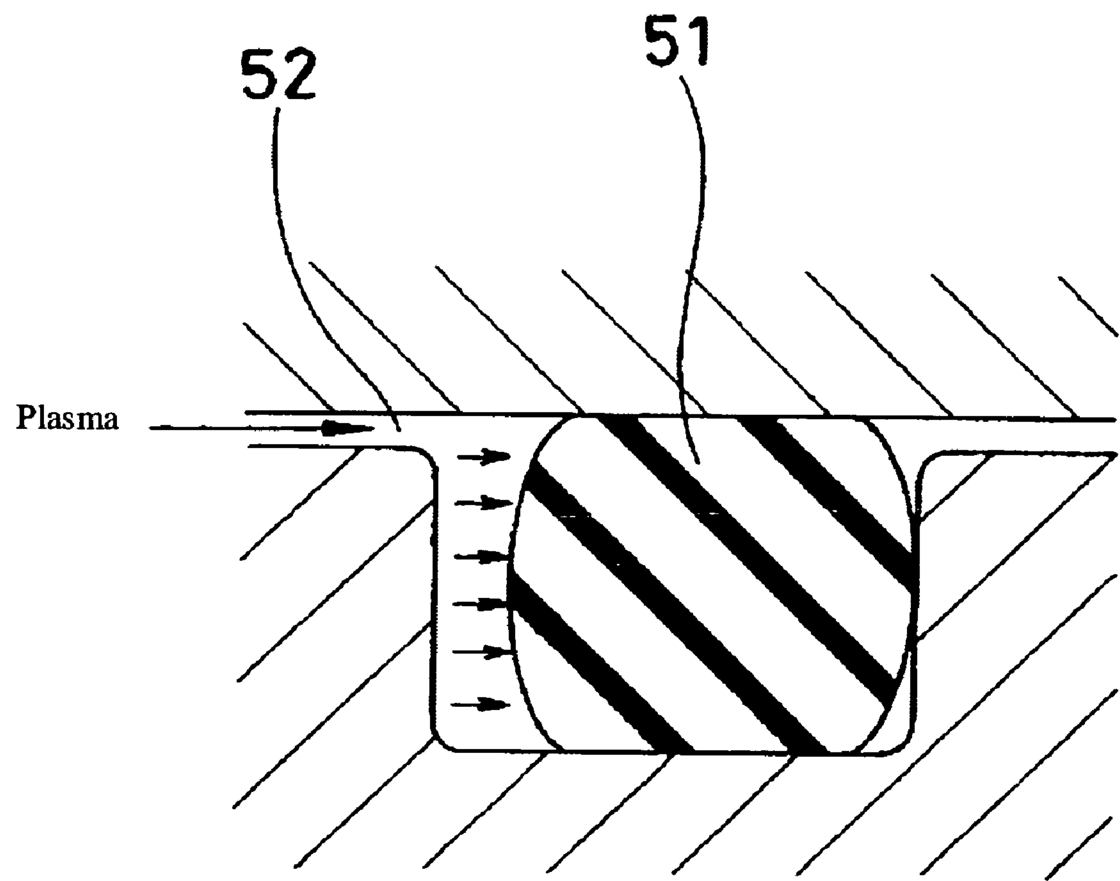
FIG. 7 is a cross sectional view of a main portion of a plasma resistant seal in accordance with a conventional example.
Figure 8:
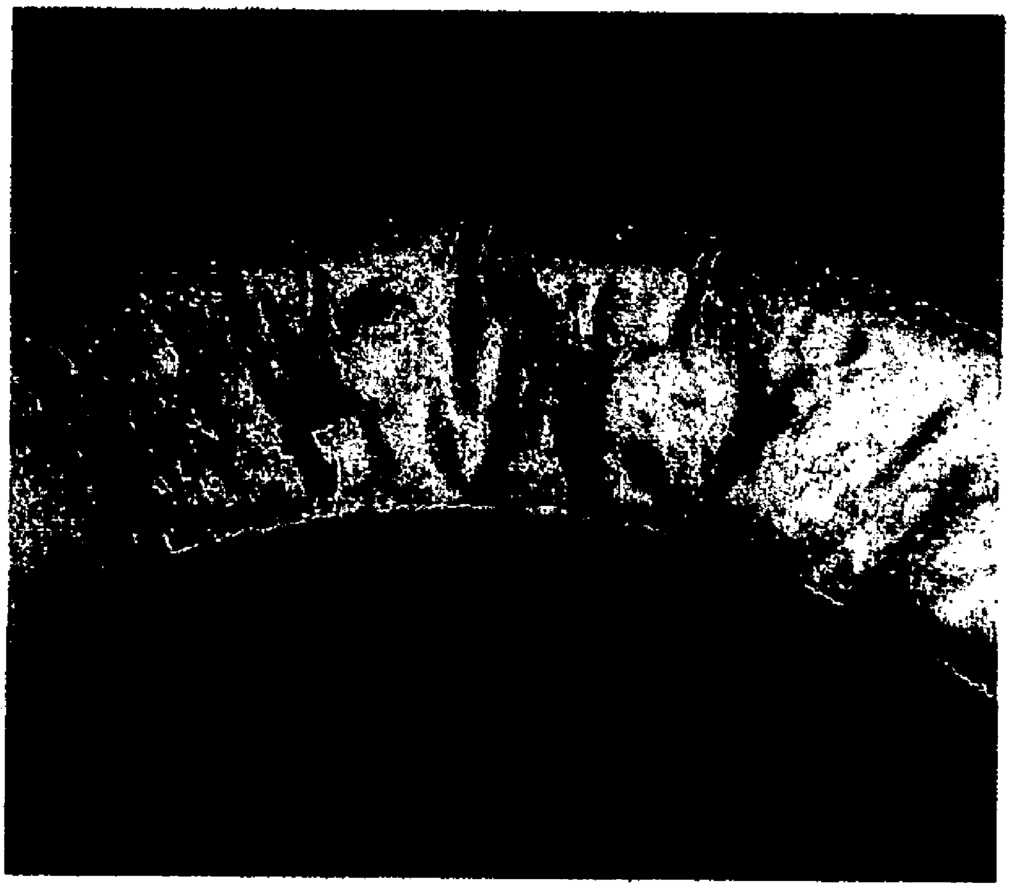
FIG. 8 is a photo map showing a defect generating state of the seal.

Further, when carrying out a surface observation of the FKM in which the plasma is irradiated from the PTFE side after closely attaching the plasma resisting FKM to the PTFE, and a surface observation of the FKM in which the plasma is irradiated directly to the plasma resisting FKM (plasma gas: $O_2$, $CF_4$), results shown in a photo map in FIG. 6 were obtained. In accordance with the results, it is possible to confirm that the plasma resisting FKM is not deteriorated if a protection film (plate) of the PTFE exists.

Effect of the Invention and Industrial Applicability

The present invention achieves the following effects.

In the seal in accordance with the first aspect of the present invention having the structure mentioned above, since the plasma seal made of the PTFE provided with the plasma resisting performance is provided in the plasma irradiating side of the O-ring made of the rubber-like elastic material and serving as the main seal, it is possible to seal the atmospheric pressure by the O-ring serving as the main seal so as to inhibit inflow of the atmospheric pressure, and it is possible to seal the plasma by the plasma seal so as to inhibit the plasma from being applied to the O-ring. Accordingly, it is possible to effectively inhibit the O-ring from being exposed to the plasma irradiation energy so as to be deteriorated and lost, and it is possible to provide the plasma resistant seal which is excellent in both of the plasma resisting performance and the sealing performance. Further, since the plasma seal arranged in the plasma irradiating side, that is, the vacuum side of the O-ring operates as a backup ring to the O-ring, it is possible to prevent the O-ring from protruding to the gap in the vacuum side so as to be broken.

Further, in the seal in accordance with the second aspect of the present invention having the structure mentioned above, since the plasma seal made of the material provided with the plasma resisting performance is provided in the plasma irradiating side of the packing made of the rubber-like elastic material and serving as the main seal, it is possible to seal the atmospheric pressure by the packing serving as the main seal so as to inhibit inflow of the atmospheric pressure, and it is possible to seal the plasma by the plasma seal so as to inhibit the plasma from being applied to the packing. Accordingly, it is possible to effectively inhibit the packing from being exposed to the plasma irradiation energy so as to be deteriorated and lost, and it is possible to provide the plasma resistant seal which is excellent in both of the plasma resisting performance and the sealing performance. Further, since the plasma seal arranged in the plasma irradiating side, that is, the vacuum side of the packing operates as a backup ring to the packing, it is possible to prevent the packing from protruding to the gap in the vacuum side so as to be broken.

Further, in the seal in accordance with the third aspect of the present invention having the structure mentioned above, since the packing/O-ring is engaged with the side wall portion of the inner surface of the packing/O-ring installation groove, and the plasma seal is engaged with the side wall portion of the inner surface of the plasma seal installation groove, it is possible to prevent the packing/O-ring or the plasma seal from being sucked to the vacuum side, and it is possible to hold the packing/O-ring or the plasma seal in the stable state even under the negative pressure. The plasma seal used in the compressed state has a high plasma shielding effect.

Further, in the seal in accordance with the fourth aspect of the present invention having the structure mentioned above, since the plasma seal is engaged with the side wall portion of the installation groove, and the packing/O-ring is engaged with the plasma seal, it is possible to prevent the packing/O-ring or the plasma seal from being sucked to the vacuum side, and it is possible to hold the packing/O-ring or the plasma seal in the stable state even under the negative pressure. The plasma seal used in the compressed state has a high plasma shielding effect.

What is claimed is:

1. A plasma resistant seal comprising:

a plasma seal made entirely of a material provided with a plasma resisting performance, the plasma seal being provided in on a plasma irradiating side of a packing, the packing being made of a plasma resistant FKM rubber containing no mineral component and serving as a main seal, said plasma seal being made entirely of a non-filler type of polytetrafluoroethylene and said packing being an O-ring, a diameter of said packing in a height direction of said packing being larger than a height of said plasma seal as measured in the height direction of said packing, the packing being attached to a packing installation groove provided in one of two installation members, and the plasma seal being attached to a plasma irradiation side of the installation groove, the packing installation groove being formed in an approximately quadrangular cross section shape in the one installation member, a side wall portion of the packing installation groove being formed at a right angle with respect to an end surface of the one installation member in on the plasma irradiating side, and the plasma seal being compressed between the side wall portion of the packing installation groove and the packing, both of the plasma seal and the packing being compressed between the two installation members to provide a pinching of the plasma seal and the packing between each other and with the two installation members so that the plasma seal and the packing receive a reaction force under compression from the two installation members, the height direction of the packing being in a direction along the side wall portion;

the plasma seal having an arch cross sectional shape with a concave surface engaging the packing and having a convex surface engaging the side wall portion of the packing installation groove, and the convex and concave surfaces of the plasma seal being arranged along a direction generally orthogonal to a plasma irradiation direction so that the packing is prevented from protruding into a gap extending from the plasma irradiation direction.

2. An apparatus for manufacturing a semiconductor device by irradiating plasma with using a plasma resistant seal, said plasma resistant seal comprising:

a plasma seal made entirely of a material provided with a plasma resisting performance, the plasma seal being provided on a plasma irradiating side of a packing, said packing being made of a plasma resistant FKM rubber containing no mineral component and serving as a main seal, said plasma seal being made entirely of a non-filler type of polytetrafluoroethylene and said packing being an O-ring, a diameter of said packing in a height direction of said packing being larger than a height of said plasma seal as measured in the height direction of said packing, the packing being attached to a packing installation groove provided in one of two installation members, and the plasma seal being attached to a plasma irradiation side of the packing installation groove, the packing installation groove being formed in an approximately quadrangular cross section shape in the one installation member, a side wall portion of the packing installation groove being formed at a right angle with respect to an end surface of the one installation member on the plasma irradiating side, and the plasma seal being compressed between the side wall of the packing installation groove and the packing, both of the plasma seal and the packing being compressed between the two installation members to provide a pinching of the plasma seal and the packing between each other and with the two installation members so that the plasma seal and the packing receive a reaction force under compression from the two installation members, the height direction of the packing being in a direction along the side wall portion, the plasma seal having an arch cross sectional shape with a concave surface engaging the packing and a convex surface engaging the side wall at the plasma irradiation side of the packing installation groove, and the convex and concave surfaces of the plasma seal being arranged along a direction generally orthogonal to a plasma irradiation direction so that the packing is prevented from protruding into a gap extending from the plasma irradiation direction.

* * * * *